S. W. GERSTER.
MILKING VESSEL.
APPLICATION FILED MAY 4, 1909.

938,658.

Patented Nov. 2, 1909.

Witnesses
W. N. Woodson
J. M. Fallin

Inventor
S. W. Gerster,

By
H. A. Macey, Attorneys.

UNITED STATES PATENT OFFICE.

SAMUEL W. GERSTER, OF GERSTER, MISSOURI.

MILKING VESSEL.

938,658.      Specification of Letters Patent.      Patented Nov. 2, 1909.

Application filed May 4, 1909. Serial No. 493,920.

*To all whom it may concern:*

Be it known that I, SAMUEL W. GERSTER, citizen of the United States, residing at Gerster, in the county of St. Clair and State of Missouri, have invented certain new and useful Improvements in Milking Vessels, of which the following is a specification.

The object of this invention is an improved milking vessel so formed as to prevent any dirt or foreign matter from entering the receptacle and thereby contaminating the milk, the said receptacle being protected at its upper end by a hood which has a lateral opening into which the streams of milk flow during the milking operation, the milk then passing to a strainer through which it enters into the receptacle or vessel proper.

The invention consists in certain constructions, arrangements and combinations of the parts that I shall hereinafter fully described and claim.

Figure 1:
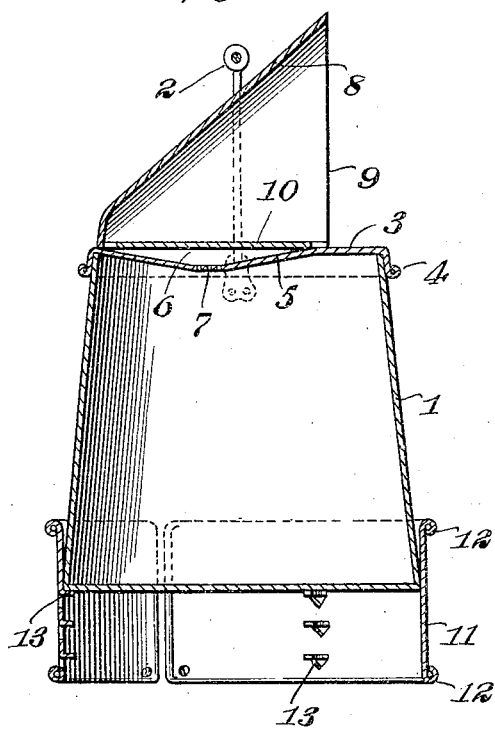
Figure 2:
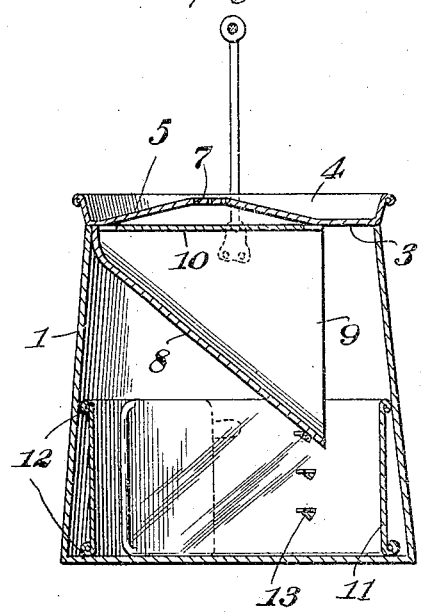
Figure 3:
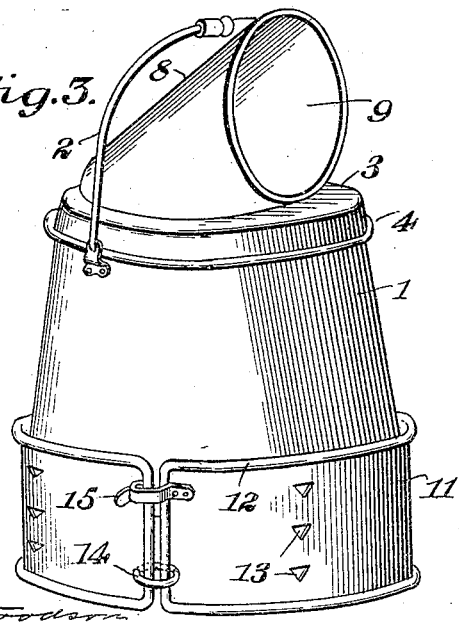
Figure 4:
Figure 5:
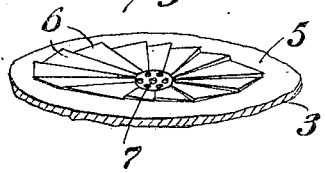

For a full understanding of the invention, reference is to be had to the following description and accompanying drawings in which:

Figure 1 is a vertical sectional view of a milking device constructed in accordance with my invention; Fig. 2 is a similar view with the parts in readiness for shipment; Fig. 3 is a perspective view thereof; Fig. 4 is a detail perspective view of a milking pan or deflector plate employed; and Fig. 5 is a fragmentary perspective view of the top or lid of the milking receptacle.

Corresponding and like parts are referred to in the following description and indicated in all the views of the accompanying drawings by the same reference characters.

Referring to the drawings, the numeral 1 designates the body portion or receptacle of my improved milking vessel, the same being of any desired size or proportion and design, and being provided with an ordinary swinging bail 2 by which it may be carried from place to place. The receptacle 1 is provided with a preferably detachable top 3 having a flange 4 designed to encircle and securely fit around the upper rim of the receptacle to hold the top thereof. The top 3 is formed with a preferably semicircular depression or dished portion 5 disposed eccentrically therein and of any desired size.

The top may be formed by one operation, being stamped and shaped out of one piece of sheet metal so as to form the flange 4 and depression 5. If desired, the depressed or dished portion 5 may be formed with a series of radially extending corrugations 6, although these may be dispensed with, as I do not regard them as an essential feature of my invention. Preferably at the center of the dished portion 5 is a strainer 7 of any desired size and construction.

8 designates a hood which is soldered or otherwise secured to the top 3 over the depressed or dished portion 5, the said hood being provided with a laterally facing entrance opening 9 into which the streams of milk are intended to be directed, the hood tapering from said opening to the bottom opening which surrounds the dished portion 5 of the top 3. A deflector plate or pan 10 with a slightly crimped edge as shown is designed to be held by frictional engagement within the hood 8 over the strainer 7, so that said pan may be detached whenever it is desired to use the hood without the pan. In other words, I do not regard the pan 10 as essential to my invention, it may be used or omitted as desired; it has, however, a useful purpose. First, it is designed to prevent the streams of milk from directly striking the strainer 7 which would tend to drive through the mesh of the strainer any particles of foreign matter that may have lodged therein, and second the said pan is intended to prevent the frothing of the milk as it presents a smooth surface which will tend to break the streams of milk up into smaller streams and thereby cause the escape of steam and animal heat, which causes an outward current which drives away from the mouth of the hood all light floating matter such as hair and fine scales or dandruff that might shed from the udder of the cow, and also keeps the milk from foaming or frothing.

In order that the milking vessel may properly be used with both large and small cows, I have provided therefor a support in which it may be held at different elevations. This support, designated 11, is preferably constructed of light sheet metal having some elasticity, and bound at top and bottom as well as its meeting edges with wire or the like 12. The supporting band 11 is desiged to encircle the lower end of the body portion or receptacle 1 of the milking vessel and the said band is formed with any desired number of spurs or prongs 13 which are preferably punched inwardly therefrom and which are designed to engage the lower edge of the receptacle so as to hold it at the desired elevation. Obviously these spurs may be any distance apart, both vertically and horizontally considered. The free ends of the supporting band 11 may be secured together in any desired way. In the present instance, for this purpose, I have shown said ends as formed at their lower corners with apertures in which a split link 14 is intended to be received, so as to detachably connect the ends of the band together at this point. One end of the band is provided near its upper corner with a spring catch 15 designed to engage the rear edge of the other band which is formed by the vertically disposed wire 12 thereof. To apply the band 11 the spring catch 15 is released and the receptacle is inserted downwardly within the band until the desired elevation is reached whereupon the corners of the two ends of the band are secured together by the catch 15 so as to properly encircle the receptacle 1 with the desired spurs 13 taking underneath the lower edge of the receptacle to hold the vessel at the desired elevation.

When the parts are not desired for use, as for instance, when shipping the device, the top with the hood 8 secured to it may be easily detached from the receptacle 1, inverted and placed upon the upper edge of the receptacle, and both the pan 10 and supporting band 11 may be deposited within the receptacle as illustrated in Fig. 2.

Having thus described the invention, what is claimed as new is:

1. A milking vessel, comprising a receptacle, a top fitted on said receptacle and provided with a depression, a strainer in said depression, the said depression being formed with radially extending corrugations leading to said strainer, and a hood fitted around said depression and formed with a laterally facing entrance opening.

2. A milking vessel, comprising a receptacle, a top fitted on said receptacle, a strainer secured to said top, a hood having a laterally facing entrance opening and surrounding said strainer, and a deflector plate mounted in the hood over the strainer.

3. A milking vessel, comprising a receptacle, a detachable top adapted to be fitted on said receptacle, a strainer in said top, and a hood rigidly connected to said top and constructed to be supported upright thereon or in an inverted position within the receptacle.

In testimony whereof I affix my signature in presence of witnesses.

SAMUEL W. GERSTER. [L. S.]

Witnesses:
 LESLIE RODGERS,
 WILLIAM C. LUCAS,
 G. B. DINNEY.